(12) United States Patent
Yazici

(10) Patent No.: US 11,141,881 B2
(45) Date of Patent: Oct. 12, 2021

(54) MANUFACTURING METHOD FOR A BUILDING SYSTEM IN REGARDS TO STRUCTURAL AND ENVIRONMENTAL FACTORS

(71) Applicant: OZYEGIN UNIVERSITESI, Istanbul (TR)

(72) Inventor: Sevil Yazici, Istanbul (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 622 days.

(21) Appl. No.: 16/006,837

(22) Filed: Jun. 12, 2018

(65) Prior Publication Data

US 2019/0375132 A1   Dec. 12, 2019

(51) Int. Cl.
| | | |
|---|---|---|
| *B29C 64/10* | (2017.01) | |
| *B28B 17/00* | (2006.01) | |
| *B33Y 50/02* | (2015.01) | |
| *B33Y 10/00* | (2015.01) | |
| *B28B 1/00* | (2006.01) | |

(52) U.S. Cl.
CPC .......... *B28B 17/0081* (2013.01); *B28B 1/001* (2013.01); *B33Y 10/00* (2014.12); *B33Y 50/02* (2014.12)

(58) Field of Classification Search
CPC ..... B28B 17/0081; B28B 1/001; B33Y 10/00; B33Y 50/02
USPC ...................................................... 264/40.1
See application file for complete search history.

(56) References Cited

U.S. PATENT DOCUMENTS 9,607,111 B2   3/2017 Aish et al.

FOREIGN PATENT DOCUMENTS

CA   2545638 A1   9/2007

OTHER PUBLICATIONS

Kevin Andrews, "Converting in situ Materials on a Planet to Support Exploration", NineSigma, Dec. 3, 2015.
Thomas Kvan et al., "Ditching the Dinosaur: Redefining the Role of Digital Media in Education", International Journal of Design Computing, vol. 7, 2004.
(Continued)

*Primary Examiner* — Jeffrey M Wollschlager
*Assistant Examiner* — Xue H Liu
(74) *Attorney, Agent, or Firm* — Bayramoglu Law Offices LLC

(57) ABSTRACT

A method for designing and manufacturing a building system in regards to environmental factors including, acquiring a visual image for determining topographic characteristics of a surface, generating a set of architectural geometries in a computing system, creating design models representing an architectural design of the building system, geometric comparison and evaluation of the topographic characteristics with the architectural geometries, selecting a design model for manufacturing the building system, manufacturing a plurality of interlockable building bricks, obtaining a plurality of interlockable modular structure by combining the interlockable building bricks, each of said bricks having a shell portion formed on the inner core of the interlockable building bricks so that the modular structure has common outer surface formed from said shell portion of each brick. The shell portion includes $TiO_2$ exhibiting a radiation-protective effect and manufacture of the building system in regards to environmental factors.

16 Claims, 11 Drawing Sheets

(56) References Cited

OTHER PUBLICATIONS

Sevil Yazici, "Building in Extraterrestrial Environments: T-Brick Shell", J. Archit. Eng., 2018,24(1): 04017037.
B. T. Werner, "Eolian dunes: Computer simulations and attractor interpretation", Geology; Dec. 1995; v. 23; No. 12; p. 1107-1110.
Andreas C.W. Baas, "Chaos, fractals and self-organization in coastal geomorphology: simulating dune landscapes in vegetated environments", Geomorphology 48 (2002) 309-328.

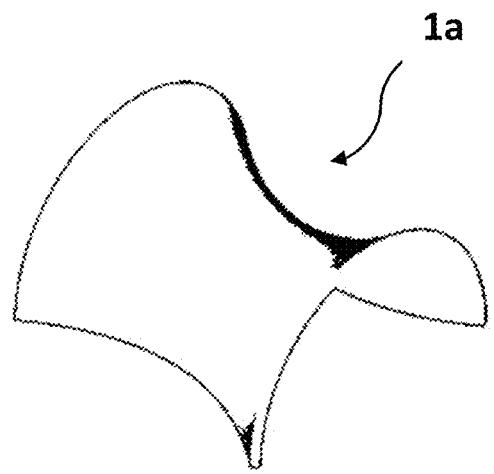
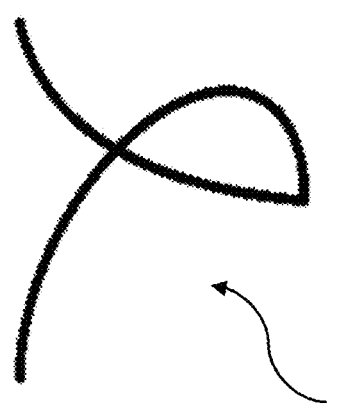
Fig. 7 a  Fig. 7 b
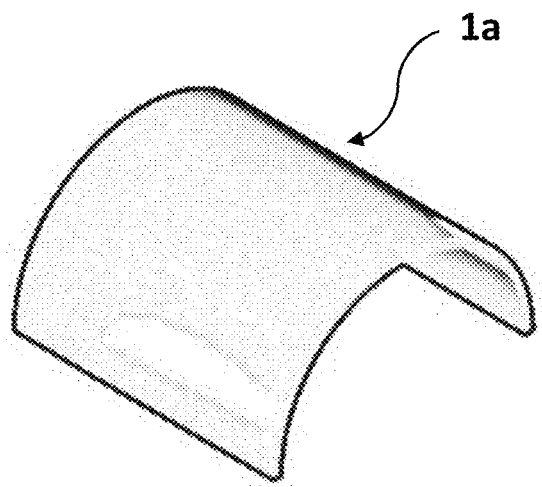
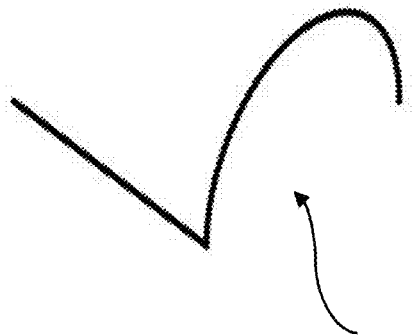
Fig. 8a  Fig. 8b

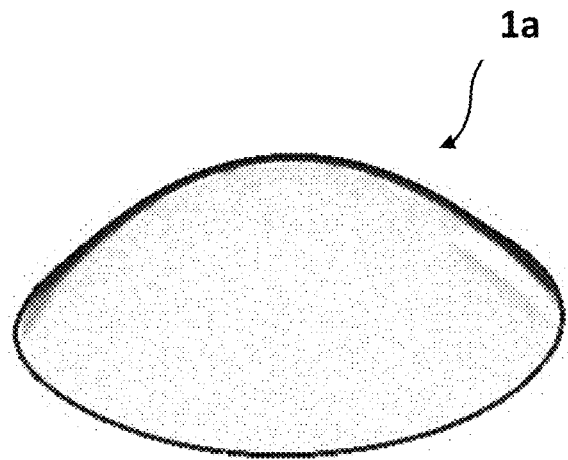
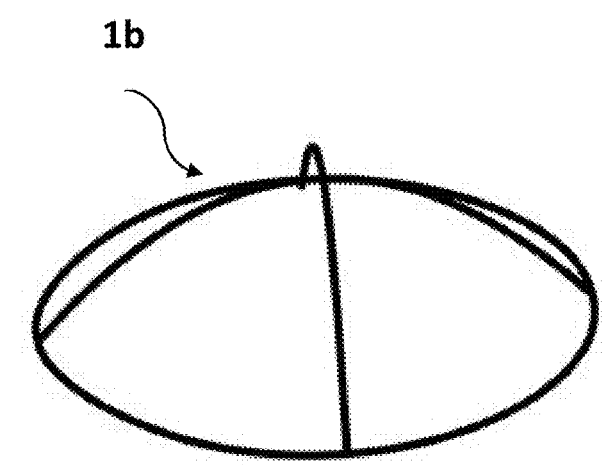
Fig. 13a                Fig. 13b
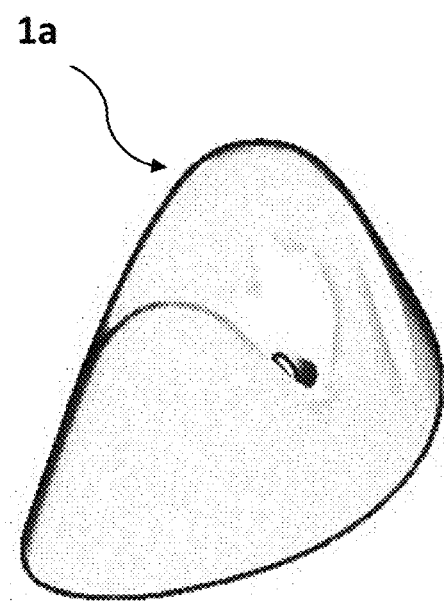
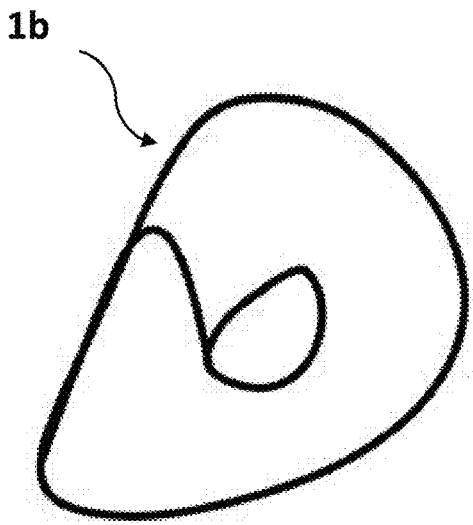
Fig. 14a                Fig. 14b

MANUFACTURING METHOD FOR A BUILDING SYSTEM IN REGARDS TO STRUCTURAL AND ENVIRONMENTAL FACTORS

TECHNICAL FIELD

This invention relates to a method for design and the manufacture of a building system, more particularly, to a modular system for system of interlockable bricks and similar structures from said bricks.

BACKGROUND

Human colonization of other planets and satellites, such as Mars or the moon is crucial for the future of the world. Space exploration focuses on new technologies to search the unknown. It has been used to investigate possibilities for the creation of the human colonies in extraterrestrial environments.

Mars is considered the most suitable planet for human colonization due to having similar environmental conditions as in Earth. Like Earth, Mars has seasons, a similar length of day, and an effective gravity; it also maintains an atmosphere. Although Mars has an atmosphere, it consists of 95% carbon dioxide, which is unsuitable for human physiology. There are also great issues on Martian land related to solar radiation and extremely cold weather conditions: Temperatures range between 20 and −153° C., and dust storms have winds that reach up to 30 m/s. (DOI: 10.1002/ad.1839). Although Mars has an atmosphere, it consists of 95% carbon dioxide, which is unsuitable for human physiology. There are also great issues on Martian land related to solar radiation and extremely cold weather conditions. Mars is abundant with resources that offer numerous raw materials required for human civilization. The colonization of Mars requires in situ resource utilization (ISRU) to harness locally derived materials, such as iron from the Martian regolith, and produce other materials on the site. The transportation of materials from Earth to Mars is not feasible considering the transportation costs. (DOI: 10.1002/ad. 1840).

Space architecture pushes the boundaries of technology and material science. The U.S. National Aeronautics and Space Administration (NASA) and the European Space Agency (ESA) are currently focusing on the creation of systems that are based on 3D printing for structures, such as dwellings or landing pods, mainly by using local resources to reduce material payloads while still providing materials that protect against high temperature fluctuations and radiation. Further emphasis is being placed on robotic space exploration because robotic systems offer numerous advantages in the extraterrestrial environment by lasting longer, being stronger, and posing fewer ethical issues than human exploration.

Space architecture brings a different emphasis to design research and a unique opportunity to extend the perspectives of humanity. The issue of setting up design systems that can accommodate complex spatial and programmatic requirements for the extreme environmental conditions of space needs to be assessed and investigated further from the architectural design point of view.

Principle of modularity is seen as an influential architectural approach for design projects. Modules are considered efficient, economical, easily transportable, and demountable. Under today's conditions, it is possible to reinterpret the concept of modularity in architectural design by the use of advanced computational design (CD) and digital fabrication technologies. CD enables the assessment of design and fabrication tools within integrated design systems by which the design is informed by various design, performance, and fabrication criteria. Highly articulated, complex formal and spatial organizations, consisting of modules that can be differentiated, can be designed and fabricated seamlessly. By varying parameters in the CD, iterations of an algorithm are created (DOI: 10.1002/ad. 2019). Digital fabrication techniques are becoming more sophisticated and are enabling the seamless production of highly differentiated parts.

A set of architectural geometry, described computationally, can respond to different spatial conditions, such as shell structures, from fully enclosed to semi-open surfaces.

Among others, a prior art publication in the technical field of the invention may be referred to as U.S. Pat. No. 9,607,111, which discloses an architectural geometry, and in particular, to a method, apparatus, system, computer program product, and article of manufacture for supporting a design of "spatial" architecture and the use of a spatial analysis of building models in related engineering design processes. According to the document, non-regular Boolean operations are used to create non-manifold bodies and non-manifold topology implemented in a 3D modelling kernel is utilized. However, the document does not disclose any information about modularity and architectural geometry of an interlocking system. Further, among others, the document CA 2545638 A1 discloses a process of producing a nano-$TiO_2$ aqueous emulsion with photocatalyse function. The nano catalyst is loaded with filtered water-soluble polyacrylate resin. According to the document, this photocatalyst coating can be applied to the surfaces of wall, brick, leather, plastic, and wood by spray gun, brush or roller, this coating is strongly adhered to the painted substrate, which makes the object possess activity of photocatalyse under sunlight. However, the document does not disclose any information about the use of titanium-dioxide-based in an outer layer against high radiation levels.

Although implemented in extraterrestrial environments, new technologies do not offer a comprehensive approach from an architecture perspective that can be implemented for different design and programmatic purposes by the use of in situ materials on Mars.

SUMMARY

The present invention proposes a method of a building system with regards to environmental factors comprising the steps of acquisition of a visual image for determination of topographic characteristics of a surface, generation of a set of architectural geometries in a computing system, creating a plurality of design models representing an architectural design of the building system, geometric comparison and evaluation of the topographic characteristics with the architectural geometries formed by a plurality of interlockable building bricks, selection a design model for manufacturing the building system, manufacture of a plurality of interlockable building bricks, obtaining a plurality of interlockable modular structure by combining a plurality of interlockable building bricks and manufacture of the building system.

According to this invention, said each interlockable building brick further comprises an inner core with walls having one or more protrusions shaped and sized to engage one or more corresponding recesses of a neighbouring brick. Moreover each of said bricks having a shell portion formed on the inner core of the interlockable building bricks so that the modular structure has common outer surface formed from said shell portion of each brick, wherein said shell portion comprises $TiO_2$.

In a possible embodiment, the interlockable building bricks are configured to match with a corresponding protrusions and recesses of another brick to allow multiple form sections to be connected to create a larger form. Thus, a larger system can be obtained by using in-situ materials.

In another possible embodiment, an interlockable building brick further comprises voids as a through hole extending in the longitudinal axis of the brick. By means of these voids, volume and weight of the building structure reduce while increasing structural efficiency.

In some exemplary embodiments of the invention, the building system is made of various in-situ materials such as regolith or local soil. Martian regolith can be provided in an unlimited amount the Mars. Said regolith may be obtained by sintering or melting.

As an alternative to high cost of material transportation from earth, 3D printing is a variable option. In a further example of the invention, the manufacture of interlockable building bricks can be carried out by a 3D printer.

In a possible embodiment of the invention, the generated set of architectural geometries comprises a series of non-uniform rational bi-spline surfaces (NURBS), which is a standard form of surface description and further comprising a plurality of primitive curves which are used to create set of architectural geometries. By varying the primitive curves and dimensions, it can be obtained different design models.

Primary object of the invention is to overcome the above mentioned shortcomings of the prior art.

Another object of the present invention is to provide an architectural design system that responds to the environmental condition.

A further object of the invention is to provide an interlockable modular buildings which offers flexibility in design with reliable of modularity.

Still a further object of the invention is to propose a geometrical configuration that can respond to the dynamic formation on the topography by increasing the resistance of the structure against the environmental condition, especially wind.

Another object of the present invention is to provide a modular system to be used on both Earth and extra-terrestrial environments.

Other objects of the present invention will become apparent from accompanied drawings, brief descriptions of which follow in the next section as well as appended claims.

BRIEF DESCRIPTION OF THE DRAWINGS

The figures whose brief explanations are herewith provided are solely intended for providing a better understanding of the present invention and are as such not intended to define the scope of protection or the context in which said scope is to be interpreted in the absence of the description.

Referring now to the drawings in which like reference numbers represent corresponding parts throughout:

FIG. 7a to FIG. 16a show schematic views of examples of architectural geometries (1a) according to the present invention.

FIG. 7b to FIG. 16b show a top view of examples of primitive curves (1a) according to the present invention.

DETAILED DESCRIPTION

Figure 1:
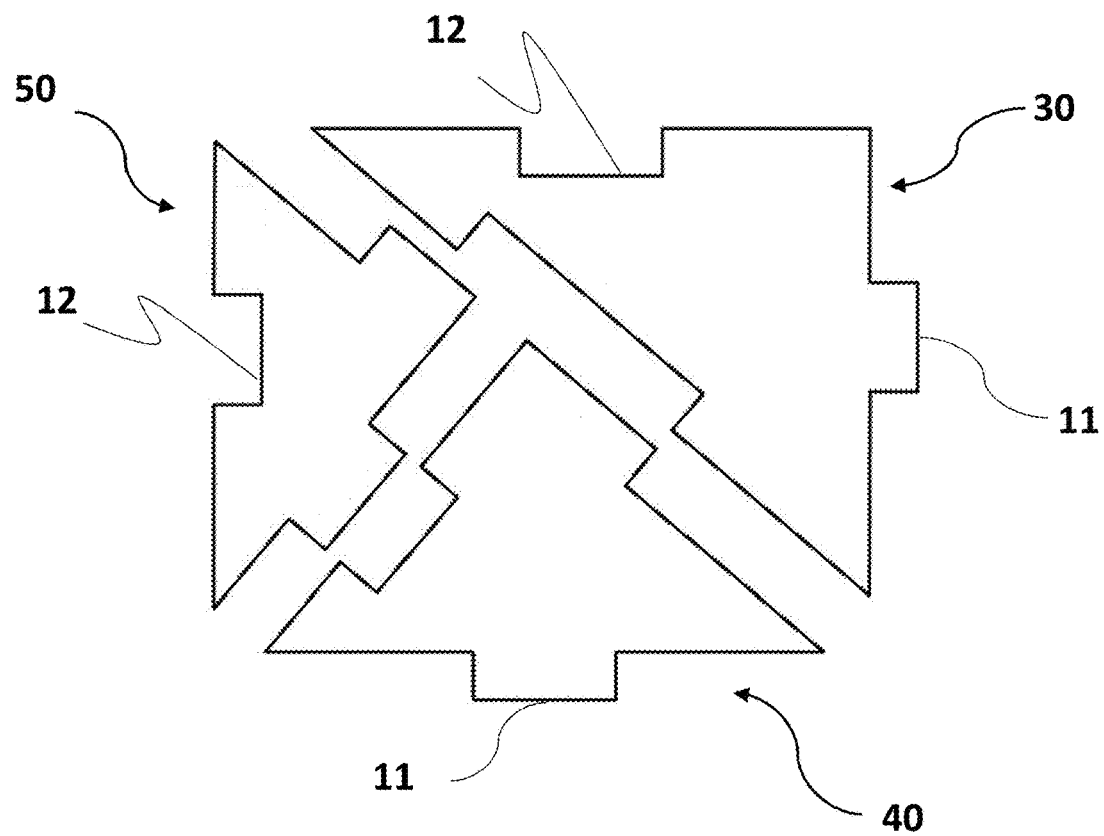
FIG. 1 shows an exploded top view of a modular structure (100) according to the present invention.

The list of reference numerals used in the appended drawings are as follows;
1a Architectural geometry
1b Primitive curve
11 Protrusion
12 Recess
13 Void
20 Inner core
30, 40, 50 Brick
71 Design model according to Werner model
72 Design model according to Von Neumann model
80 Shell portion
90 Building system
100 Modular structure Hereinafter, preferred embodiments of the present invention will be described in detail with reference to the accompanying drawings which are given solely for the purpose of exemplifying embodiments according to the present invention.

According to the present invention, a method of a building system (90) with regards to environmental factors is proposed in which an interlockable building brick (30, 40, 50) for constituting a modular structure (100) having a shell structure (80) containing $TiO_2$ exhibiting a radiation-protective effect are manufacture especially with using in-situ materials. Within the scope of this invention, a modular structure (100) is processed to respond to the dynamic formation on the topography by increasing resistance of the structure against the severe environmental condition. The building system (90) can be a construction which is manufactured with respect to a design model created in a computing system after various tests and analyzes for obtaining optimum design against environmental factors for example in an extraterrestrial fields.

According to the present invention, the method of a building system (90) with regards to environmental factors mainly comprising the steps of; acquisition of a visual image for determination of topographic characteristics of a surface in a dune field; using a design model (71, 72) obtained as a result of dune field simulation to reduce the wind load on the surface of Mars on the structure; generation of a set of architectural geometries (1a) with respect to the topographic characteristic of the surface in a computing system; creating a plurality of design models representing an architectural design of the building system (90) according to a selected architectural geometry (1a) in the computing system; geometric comparison and evaluation of the topographic characteristics with the architectural geometries (1a) constituted by a plurality of interlockable building bricks (100) of a plurality of interlockable building bricks (30,40,50) in the computing system; selection a design model for manufacturing the building system (90); manufacture of a plurality of interlockable building bricks (30,40,50), said each interlockable building brick (30,40,50) comprising an inner core (20) with walls having one or more protrusions (11) shaped and sized to engage one or more corresponding recesses (12) of a neighbouring brick (30,40,50); obtaining a plurality of modular structures (100) by combining the plurality of interlockable building bricks (30,40,50), each of said bricks (30,40,50) having a shell portion (80) formed on the inner core (20) of the interlockable building bricks (30,40,50) so that the modular structure (100) has common outer surface formed from said shell portion (80) of each brick (30,40,50), wherein said shell portion (80) comprises $TiO_2$; and manufactures of the building system (90) according to the selected design model by using said interlockable modular structures (100).

In an example of the invention, there is provided an efficient system in which in situ materials such as Martian regolith is converted into interlocking structural elements as modular design solutions that can create various design possibilities. In response to the severe environmental conditions and heavy wind storms on Mars, sand dunes form on the Martian topography. Sand dune formations represent fluidity and complexity with a high level of articulation and coherence from a systematic perspective, which is investigated initially in the design process. Wind flow above the surface of Mars creates land forms representative of self-organized patterns. Mathematical models are used to understand natural phenomena. Complex, nonlinear, dynamic systems are used to simulate landscape phenomena in geomorphology. Through computer simulations related to the transport of sand by wind, different forms may be produced, including Barchan, crescentic ridge, linear, and star natural dune classes. The basic mathematical model for the dune field was developed by Werner (DOI: 10.1130/0091-7613 (1995)023<1107:EDCSAA>2.3.CO;2). The main principle of the algorithm is that the sand batches are transported in a stochastic procedure through which erosion, transport, and deposition processes are determined by chance (DOI: 10.1016/S0169-555X(02)00187-3). Abstract models are able to describe the dune field evolution As an embodiment, for determination of topographic characteristics of a surface of a dune field in Mars, first a satellite view as a visual image reflecting the local characteristic of Martian topography is analyzed. Through computer simulations related to the transport of sand by wind, different forms may be produced, including Barchan, crescentic ridge, linear, and star natural dune classes. A dune field simulator software can be exploited to understand the dynamic characteristic of the geomorphology of Martian land caused by the extreme wind conditions.

Figure 17:
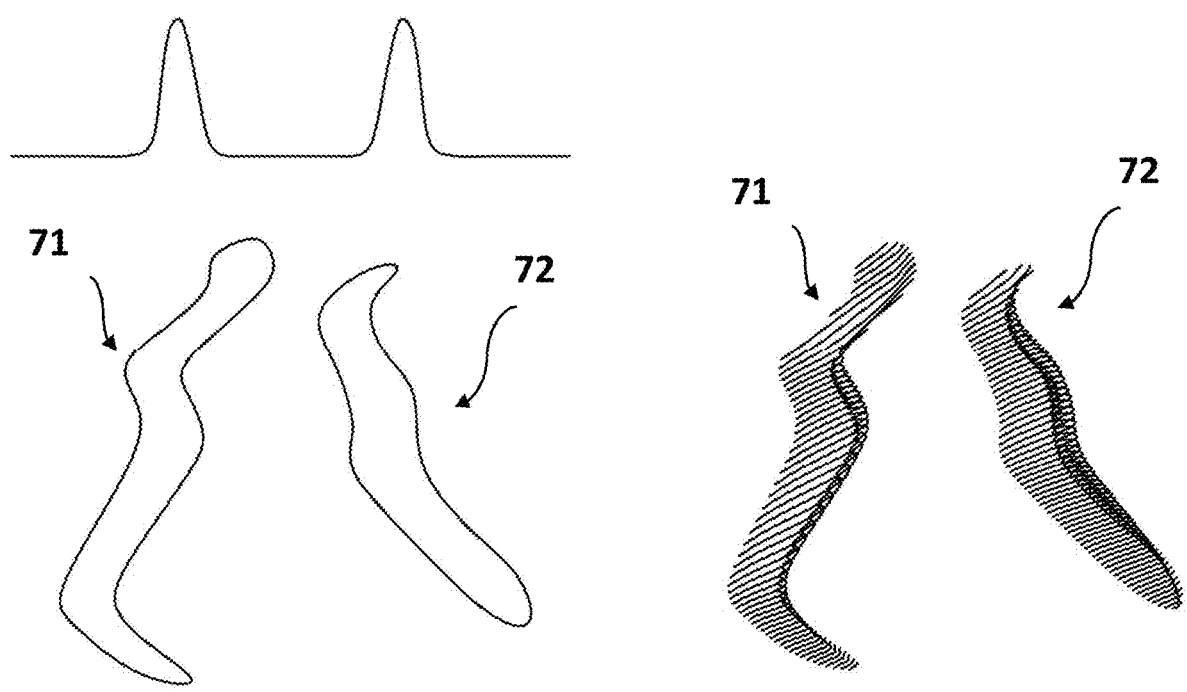
FIG. 17 show a top view of geometric modeling provided by dune field simulation.

The parameters in Table 1 can be referred during simulation. Various other models can be implemented into the system by using existing model structures. Each model can be run with several methods for finding steep slopes, such as the Moore, deterministic Von Neumann, or stochastic. After setting the dune field dimensions and a sand height, an initialization method is specified as random or uniform. By running the simulation, the dune field elevation is displayed. Two dune field simulations can be conducted for comparison. The length and width of the area can be defined as 256×256, and the sand height value can be 2. The algorithm was based on the Werner model with the selection of "no erosion in shadow." The neighborhood method was specified as Von Neumann deterministic. The two simulations only differ in their hop value, L, which was assigned as 1 and 3, respectively. By running the simulations for the same periods of time, the results can be compared. By altering configuration of the self-organized pattern changed along with the maximum height that the system can reach. With an L of 1, the height of the dunes reached up to 14; with an L of 3, it reached a maximum of 24. On the basis of the top view and elevation, the geometry is modelled three-dimensionally in the geometric modeling software as shown in FIG. 17. The obtained models are suitable for the local characteristic of Martian topography and severe environmental conditions and heavy wind storms on Mars.

TABLE 1

| Parameters of dune field simulator | |
|---|---|
| Model | B. Werner (1995) + no erosion in shadow |
| Neighbourhood | Von Neumann, deterministic |
| Initial conditions | Random |
| Length × Width | 256 × 256 |
| Sand Height | 2 |
| p(sand) | 0.6 |
| p(No Sand) | 0.4 |
| L(hop) | 3 |
| Show | Elevation |

A set of architectural geometries (1a) with respect to the topographic characteristic can be generated comprising of a series of nonuniform rational bispline surfaces (NURBS) which is a standard form of surface description in computing system (Piegl and Tiller ISBN 978-3-642-97385-7). On the basis of the dune field simulation results, the overall height of the dune field is taken into consideration in the arrangement of a geometric cluster; thus, the cluster offers a variety of surfaces of highly rational geometries, such as domes, and free-form geometries with greater differentiation and complexity. When defining the architectural geometry for geometric comparison of the topographic characteristics, the parameters such as dimensions, material properties are taken into consideration and can be varied.

In some exemplary embodiments of the invention, a set of architectural geometries (1a) can be developed within a software (such as software called as a "Rhino 5 3 D geometric modeling") including surface operation tools such as sweep 1& 2, loft, revolve and network surface. As seen in the examples of FIG. 7 to FIG. 16, the architectural geometry (1a) may be configured in a wide variety of shapes. Wherein the primitive curves (1b) and dimensions of said bricks (30, 40, 50) can be varied when generating architectural geometries.

For example, in the embodiment of FIG. 7a, the length, width and height values are entered as dimensions 10, 10 and 5, respectively, in said software, and the sweep 1 operator is used by assigning a primitive curve in FIG. 7b, as an initial curve.

In another embodiment of FIG. 8a, the length, width and height values are entered as dimensions 10, 10 and 5, respectively, in said software, and the loft operator is used by assigning a primitive curve in FIG. 8a, as an initial curve.

Figure 9A:
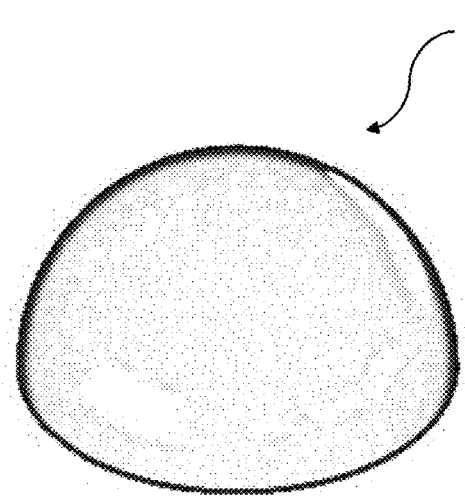
Figure 9B:
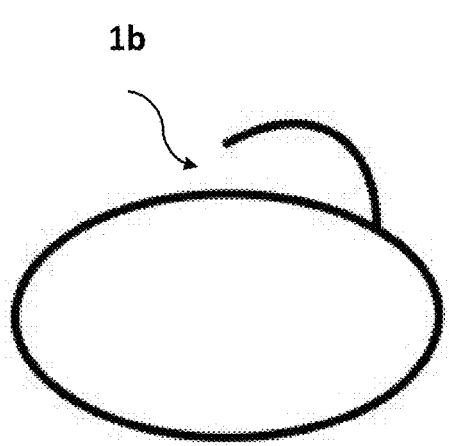

In another embodiment of FIG. 9a, the diameter and height values are entered as dimensions 10 and 5, respectively, in said software, and the sweep1 operator is used by assigning a primitive curve in FIG. 9a, as an initial curve.

Figure 10A:
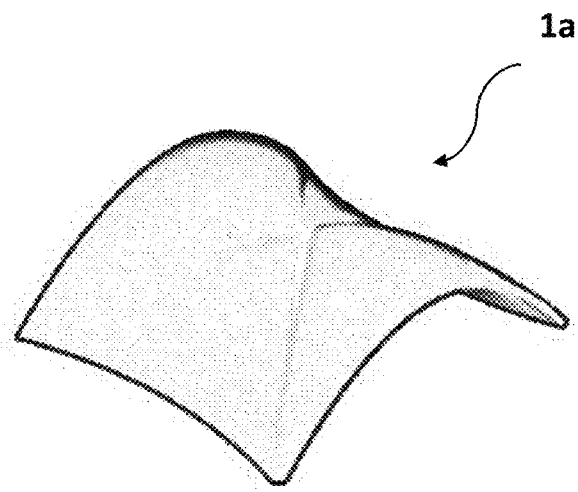
Figure 10B:
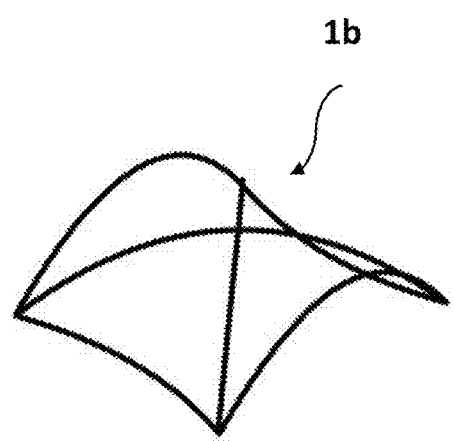

In the embodiment of FIG. 10a, the length, width and height values are entered as dimensions 13.64, 12.27 and 4.11, respectively, in said software, and the sweep2 operator is used by assigning a primitive curve in FIG. 10b, as an initial curve.

Figure 11A:
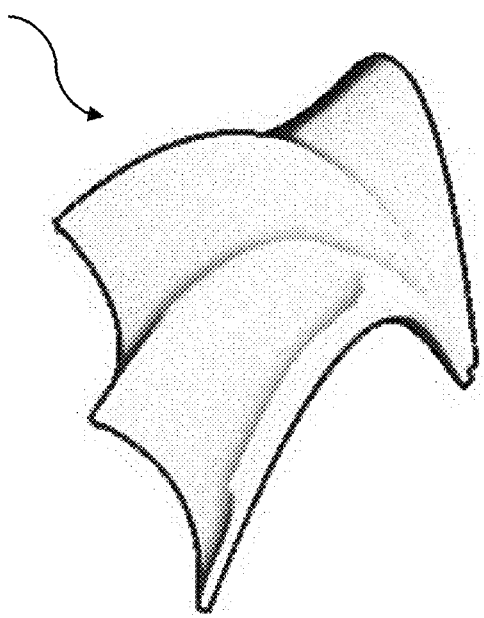
Figure 11B:
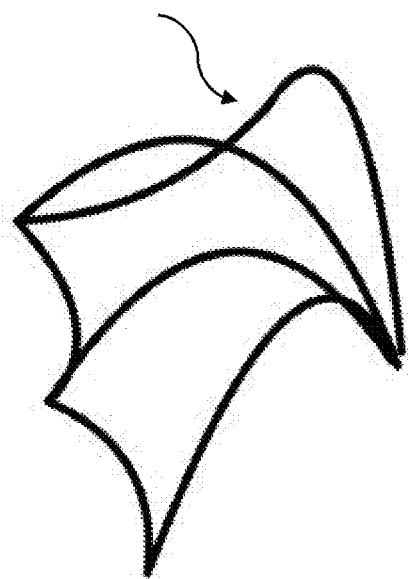

In the embodiment of FIG. 11a, the length-I, length-II, height-I and height-II values are entered as dimensions 12.23, 9.73, 5.02 and 4.36, respectively, in said software, and the sweep2 operator is used by assigning a primitive curve in FIG. 11b, as an initial curve.

Figure 12A:
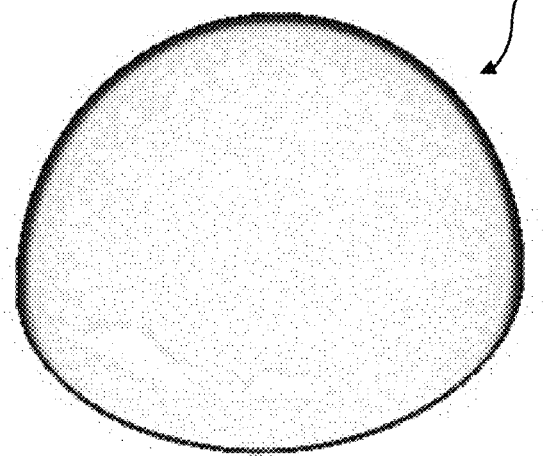
Figure 12B:
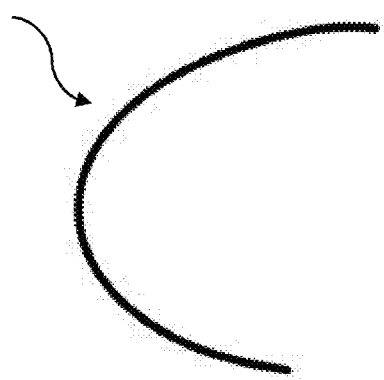

In the embodiment of FIG. 12a, width, the arc length, and height values are entered as dimensions 17.36, 28.54 and 8.30, respectively, in said software, and the revolve operator is used by assigning a primitive curve in FIG. 12b, as an initial curve.

In the embodiment of FIG. 13a, the width, arc length, and height values are entered as dimensions 19.44, 28.08 and 6.04, respectively, in said software, and a network surface operator is used by assigning a primitive curve in FIG. 13b, as an initial curve.

In the embodiment of FIG. 14a, the length, width, height-I and height-II values are entered as dimensions 20.69, 10.22, 4.96 and 6.96, respectively, in said software, and a network surface operator is used by assigning a primitive curve in FIG. 14b, as an initial curve.

Figures 15A, 15B:
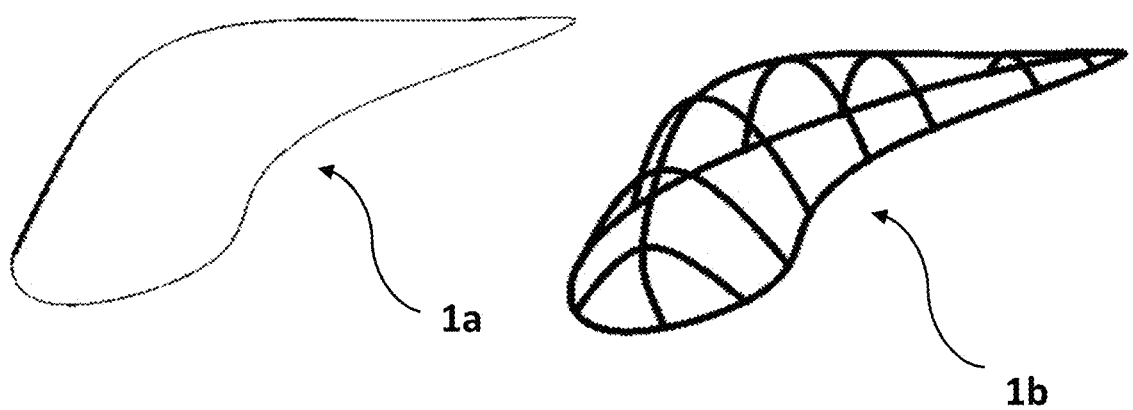

In the embodiment of FIG. 15a, the length, width and height values are entered as dimensions 44.49, 8.55 and 9.07 respectively, in said software, and a network surface operator is used by assigning a primitive curve in FIG. 15b, as an initial curve.

Figures 16A, 16B:
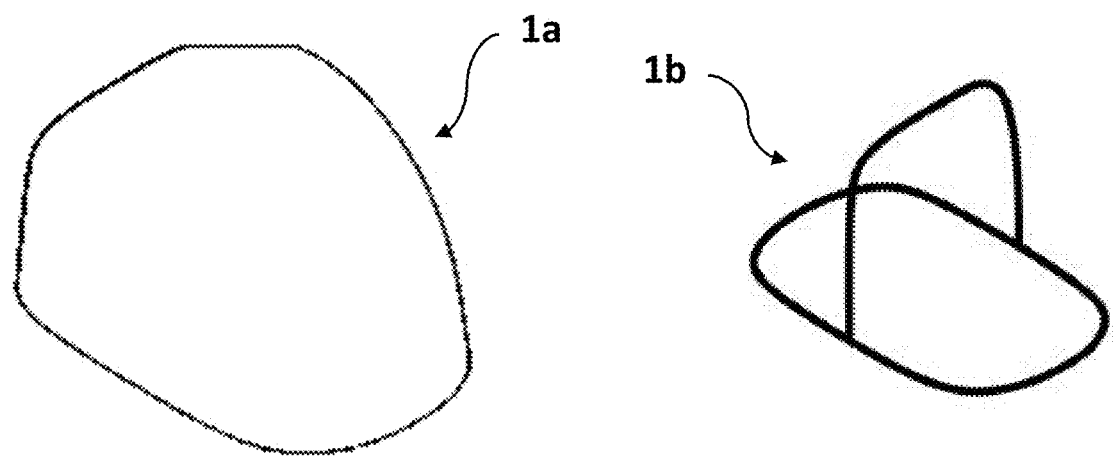

In the embodiment of FIG. 16a, the length, width and height values are entered as dimensions 4.90, 3.07 and 2.98 respectively, in said software, and a network surface operator is used by assigning a primitive curve in FIG. 10b as an initial curve.

Following the generation of the architectural geometry (1a) through the surface operation, the design model is created representing an architectural design (1a) of the building system (90) according to a selected architectural geometry (1a) in the computing system by the means of the creation of the interlockable modules of the structure.

Figure 3:
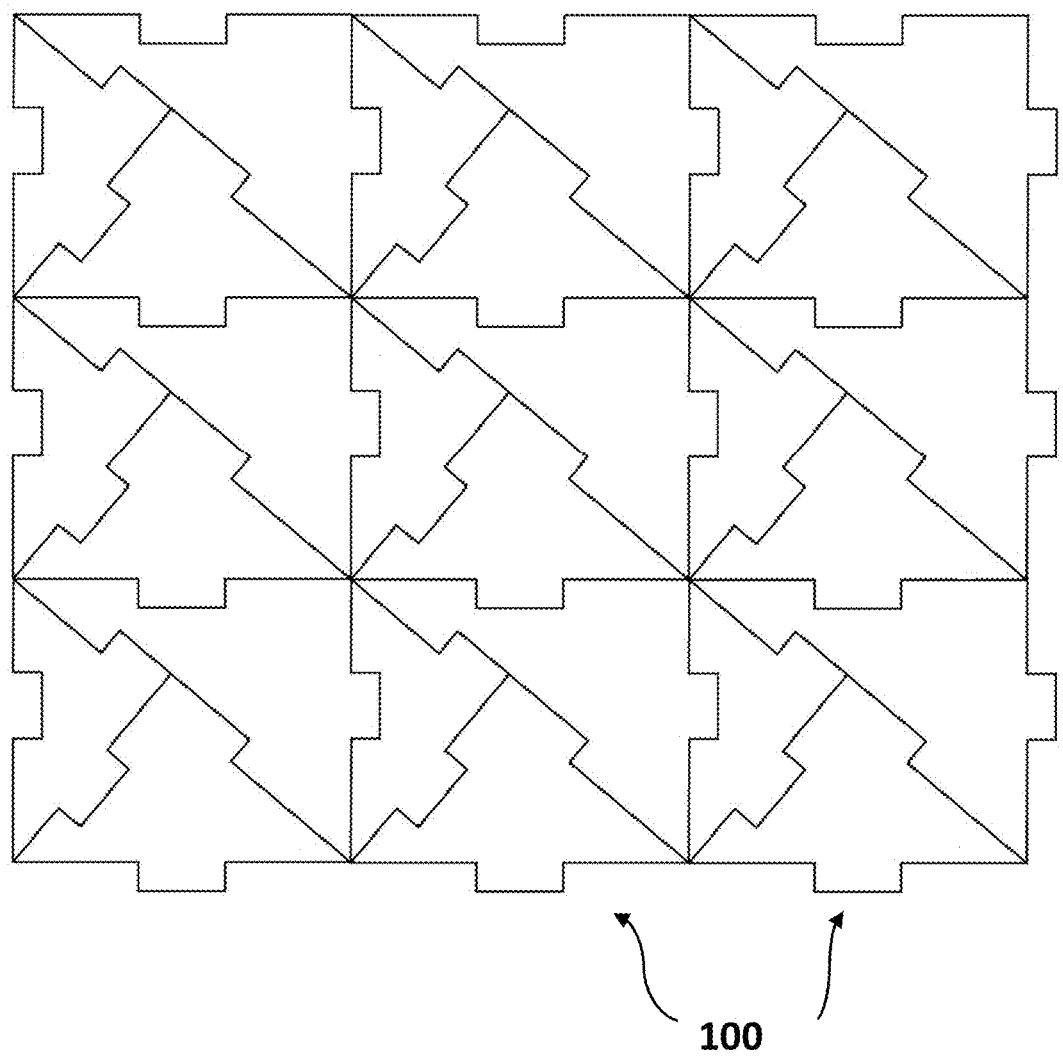
FIG. 3 shows an example of a plurality of modular structure combined together according to the present invention.

In an example, a software called Rhino can be used for the creation of the interlockable building bricks (30,40,50) of the modular structure (100). Said bricks (30,40,50) are configured to match with corresponding protrusions and recesses of another brick (30,40,50) to allow multiple form sections to be connected to create a larger form. As shown in FIG. 3, a toothed flat module is designed to be interconnected with larger surfaces, which are multiples of triangular forms, including squares.

Figure 4A:
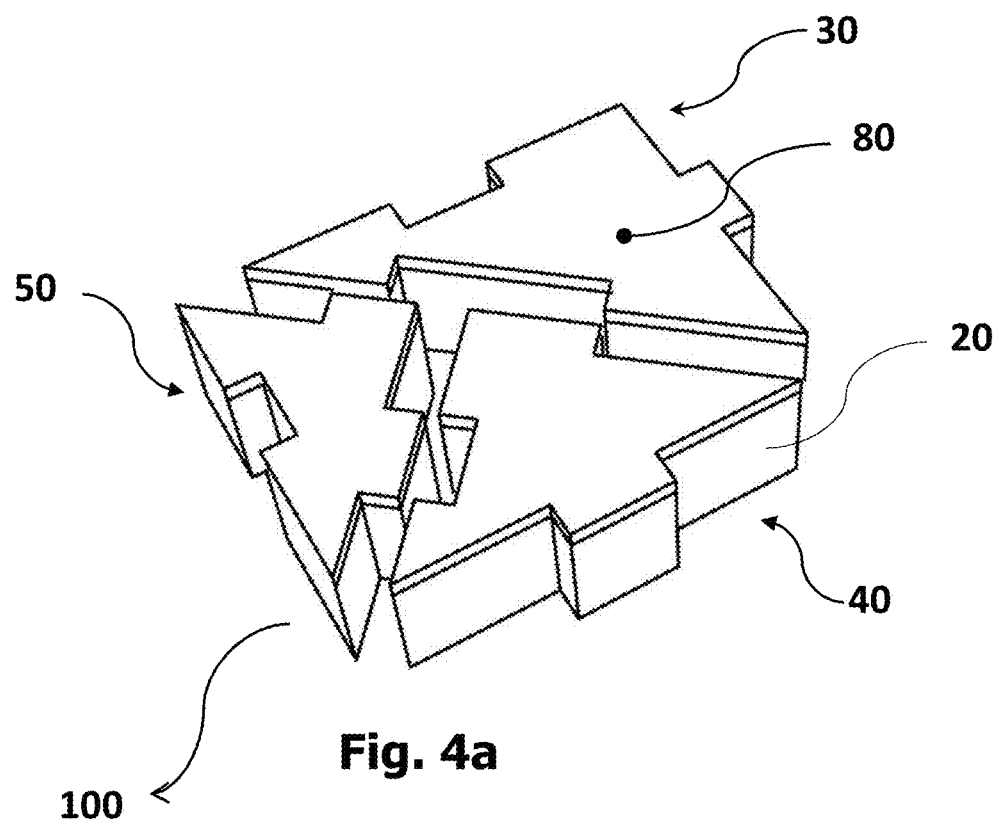
FIG. 4a and FIG. 4b show perspective views of the modular structure (100) according to the present invention.
Figure 4B:
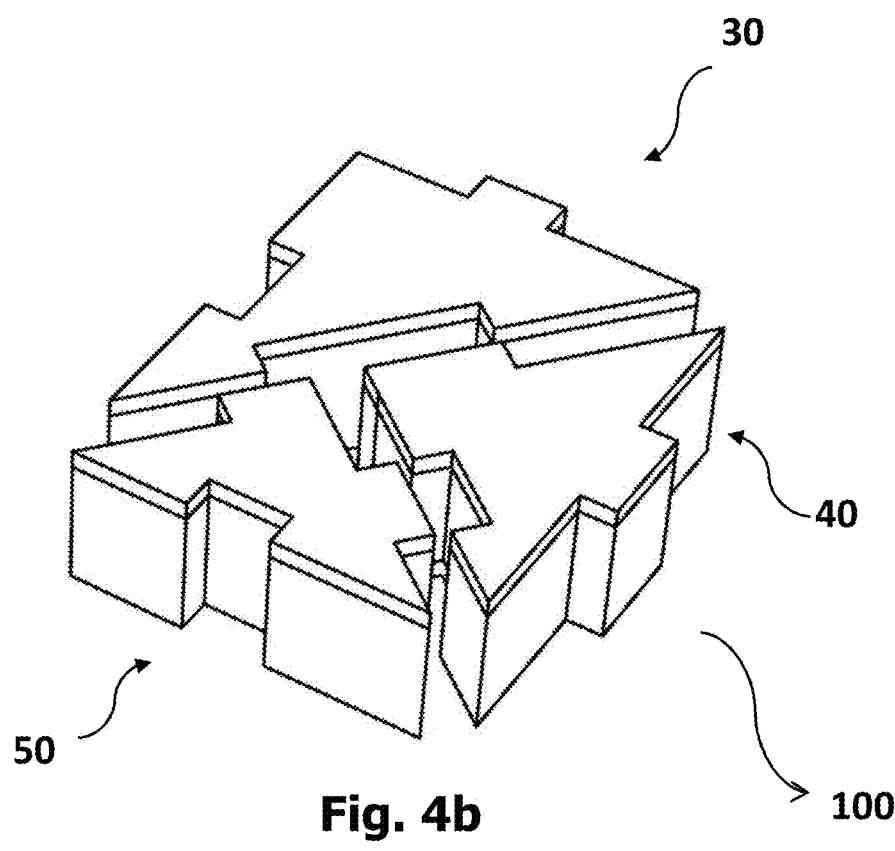

In another embodiment, as shown in FIG. 4; each interlockable building brick (30, 40, 50) comprises an inner core (20) with walls having one or more protrusions (11) shaped and sized to engage one or more corresponding recesses (12) of a neighbouring brick (30,40,50); each of said bricks having an outer shell portion (80) formed on the inner core (20) of the interlockable building bricks (30,40,50) so that modular structure (100) has common outer surface formed from said outer shell portion (80) of each brick, wherein said outer shell portion (80) comprises $TiO_2$. These interlockable building bricks (30,40,50) (can be abbreviated as T-brick) containing $TiO_2$ used in outer shell portion (80) can also be obtained by extracting from local soil.

Figure 5:
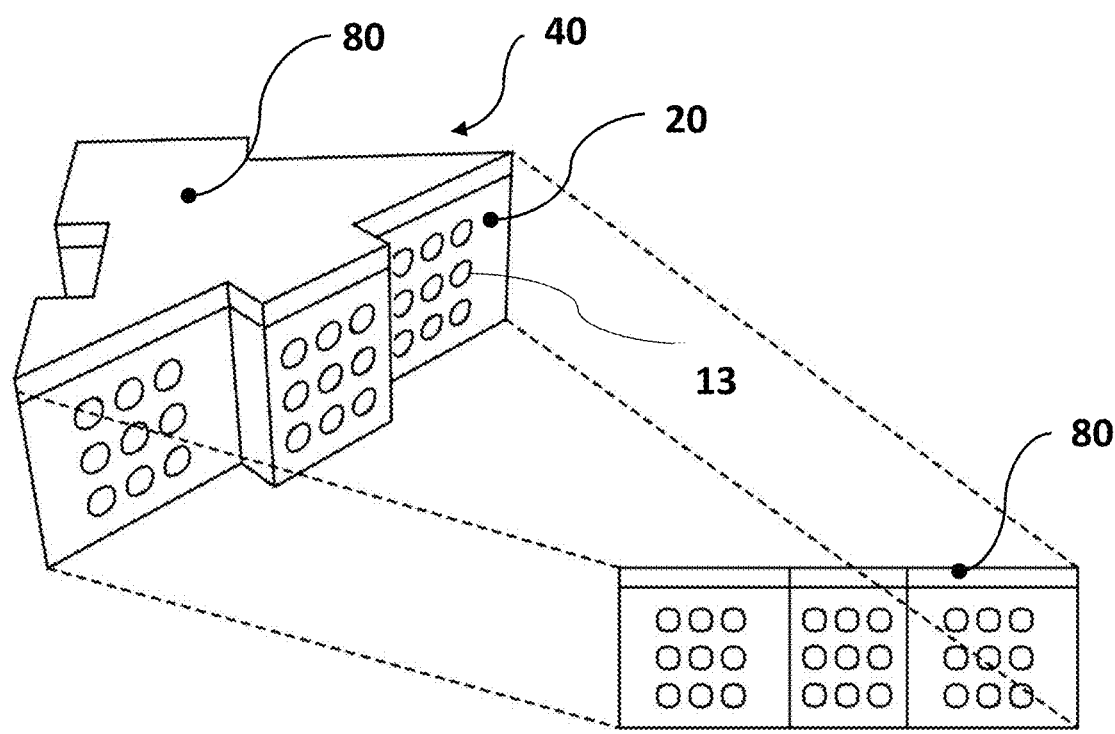
FIG. 5 shows a perspective and front views of an interlockable building brick (40) according to present invention.

In another embodiment as shown in FIG. 5, schematically illustrates typical interlockable building bricks (30,40,50) can include a plurality of voids (13) as a through hole extending longitudinal axis of the brick, thereby reducing volume and weight.

Figure 6:
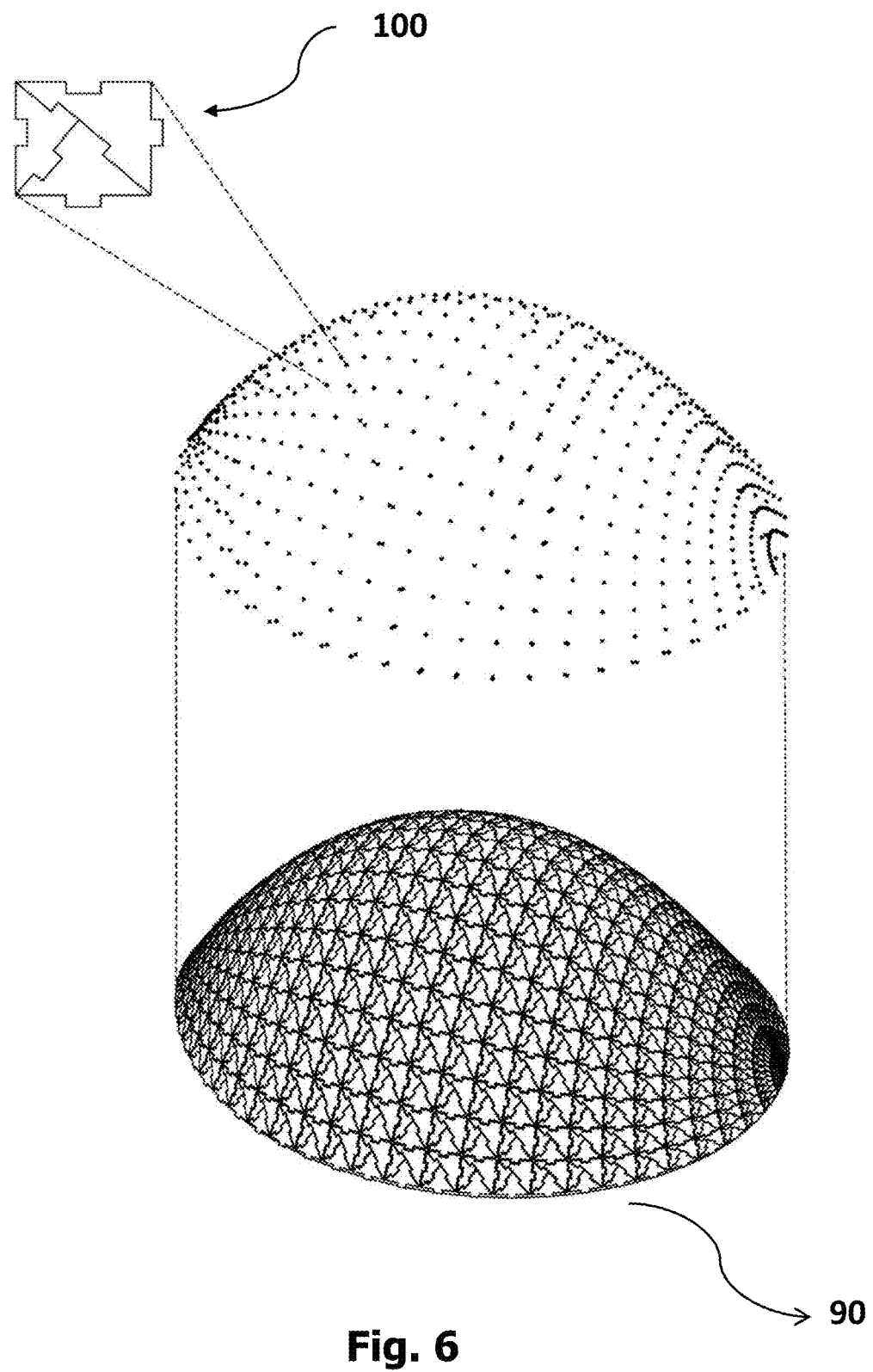
FIG. 6 shows a perspective view of a building structure (90) in accordance with the design model according to the present invention.

In an embodiment, the manufacture of interlockable building bricks (30, 40, 50) may be carried out by a 3D Printer to form a building system (90) in accordance with the design model. Said building system (90) can be shaped as a fully enclosed dome configuration, as shown in FIG. 6.

In an embodiment of the present invention, the building system (90) can be made of in-situ material. In an example of this embodiment, the in-situ material may be regolith which can be processed by sintering or melting.

In another example of this embodiment, Martian regolith may be in situ material which used to create interlockable building bricks (30, 40, 50). The ingredients in the Johnson Space Center (JSC) Mars-1 Martian Simulant can be used as a reference for the design of the material system, for which the typical regolith is characterized in Table 1, as specified in the challenge document (Nine Sigma 2015)

TABLE 2

| Regolith Composition on Marian Land (Mass %) (Data from Nine Sigma 2015) | |
|---|---|
| Oxide | JSC Mars-1 Martian Simulant |
| $SiO_2$ | 43.7 |
| $TiO_2$ | 3.8 |
| $Al_2O_3$ | 23.4 |
| $Fe_2O_3$/FeO | 15.3 |
| MnO | 0.3 |
| MgO | 3.4 |
| CaO | 6.2 |
| $Na_2O$ | 2.4 |
| $K_2O$ | 0.6 |
| $P_2O_5$ | 0.9 |
| Total | 100.0 |

In another example of this embodiment, wherein said the regolith composition can include the following (w/w):

| | |
|---|---|
| $SiO_2$ | 30-45% |
| $Al_2O_3$ | 18-26% |
| $TiO_2$ | 2-10% |
| $Fe_2O_3$/FeO | 9-20% |
| CaO | 3-10% |

Figure 2:
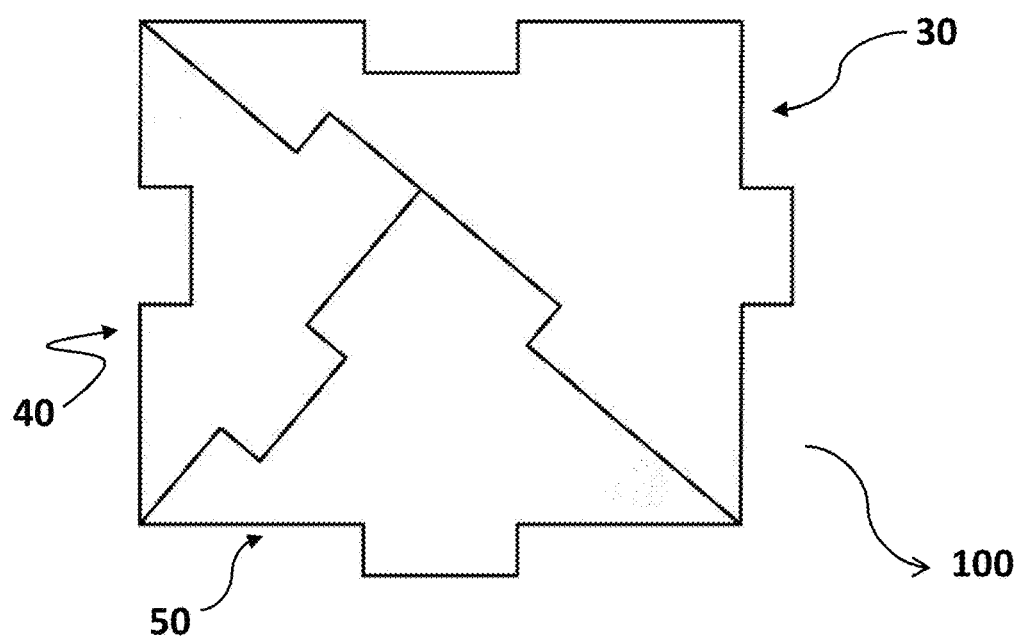
FIG. 2 shows a top view of a modular structure (100) according to the present invention.

In another embodiment of the present invention, the interlockable building brick (30, 40, 50) is suitable for payload package constraints shown in Table 2 which is described by NASA is provided. The maximum payload is indicated as 700 kg for a volume of 2×1×1 m. For every kilogram of native materials used, 11 kg of transportation propellant and spacecraft mass is saved (Nine Sigma 2015). The reference material for T-brick has the density of 2,410 kg/m$^3$. The size of the modular structure (100) is restricted to meet the payload package constraints, and one side of a module cannot be larger than 2 m, as determined by the U and V values of the initial geometry. As shown FIG. 2, the modular structure (100) having the dimensions of the initial module which are 98×117 cm is obtained within the scope of this embodiment.

TABLE 3

| Payload Package Constraints (Data from Nine Sigma 2015) | |
|---|---|
| Parameter | Value |
| Maximum payload mass [$mp_{max}$ (kg)] | 700 |
| Payload dimension [length (m)] | 2 |
| Payload dimension [height (m)] | 1 |
| Payload dimension [width (m)] | 1 |
| Maximum payload volume [$V_{max}$ (m$^3$)] | 2 |

As an example, Finite Element Method (FEM) can be applied for geometric comparison and evaluation of the topographic characteristics with the architectural geometries (1a) constituted by a modular structure (100) of a plurality of interlockable building bricks (30,40,50) in the computing system. Considering the existing topography on Mars, FEM by the Rhino scan-and-solve feature can be undertaken for static structural performance simulation to assess the displacements and stresses on the design model shown in FIG. 5. A scalar force of 1,500 kN can be applied and according to the simulation results, the minimum and maximum displacements range between $3.55709 \times 10^{-10}$ and $7.58634 \times 10^{-5}$ m as shown in Table 3.

TABLE 4

Results of the FEM Simulation: Displacements and Stresses on the Geometry

| Result extrema | Minimum | Maximum |
| --- | --- | --- |
| x-displacement (m) | $-2.90731 \times 10^{-5}$ | $1.83117 \times 10^{-5}$ |
| y-displacement (m) | $-2.98874 \times 10^{-5}$ | $3.56451 \times 10^{-5}$ |
| z-displacement (m) | $-7.17405 \times 10^{-5}$ | $3.265 \times 10^{-7}$ |
| Total displacement (m) | $3.55709 \times 10^{-10}$ | $7.58634 \times 10^{-5}$ |
| von Mises stress (Pa) | 1,797.24 | 789,926 |
| Max principal stress (Pa) | −208,469 | 315,395 |
| Mean principal stress (Pa) | −244,371 | 78,033.8 |
| Min principal stress (Pa) | $-1.01573 \times 10^{6}$ | 51,035.7 |

The present invention is not limited to the examples shown and described. The configuration described herein and the particulars thereof can be readily applied to a variety of products and applications. It is therefore understood that the above-described embodiments are illustrative of only a few of the possible specific embodiments which can represent applications of the invention. Numerous and varied other arrangements can be made by those skilled in the art without departing from the spirit and scope of the invention.

I claim:

1. A method of manufacturing a building system with regards to environmental factors, comprising the steps of:
   - acquiring a visual image for determination of topographic characteristics of a surface in a dune field:
   - generating a set of architectural geometries with respect to the topographic characteristics of the surface in a computing system;
   - creating a plurality of design models representing an architectural design of the building system to be manufactured based on a selected architectural geometry in the computing system;
   - geometrically comparing and evaluating the topographic characteristics with the set of the architectural geometries formed by a plurality of interlockable building bricks, in the computing system;
   - selecting one of the design models for manufacturing the building system;
   - manufacturing the plurality of interlockable building bricks, wherein each of the interlockable building bricks comprises an inner core with walls having one or more protrusions shaped and sized to engage one or more corresponding recesses of a neighboring interlockable building brick;
   - obtaining a plurality of interlockable modular structure by combining the plurality of the interlockable building bricks, wherein each of the interlockable building bricks has a shell portion formed on the inner core of the interlockable building bricks so that each of the interlockable modular structure has a common outer surface formed from the shell portion of each of the interlockable building bricks, wherein the shell portion comprises $TiO_2$; and
   - manufacturing the building system according to the selected design model with the interlockable modular structure.

2. The method according to claim 1, wherein the interlockable building bricks are configured to match with corresponding protrusions and recesses of neighboring interlockable building bricks to allow multiple form sections to be connected to create a larger form.

3. The method according to claim 1, wherein parameters of dimensions of the design models and material specialties are varied when defining the set of the architectural geometries for geometrically comparing and evaluating the topographic characteristics.

4. The method according to claim 1, wherein the set of the architectural geometries comprises a series of non-uniform rational bi-spline (NURBS) surfaces.

5. The method according to claim 1, further comprising a step of generating a plurality of primitive curves used to create the set of the architectural geometries.

6. The method according to claim 5, wherein the plurality of the primitive curves and dimensions of the primitive curves are varied when generating the set of the architectural geometries.

7. The method of according to claim 1, wherein the building system is shaped as a fully enclosed dome configuration with respect to the selected design model.

8. The method according to claim 1, wherein each of the interlockable building bricks further comprises voids as a through hole extending in a longitudinal axis of each of the interlockable building brick.

9. The method according to claim 1, wherein the building system is made of an in-situ material.

10. The method according to claim 9, wherein the in-situ material is regolith.

11. The method according to claim 10, wherein the regolith comprises 30-45% w/w of $SiO_2$, 18-26% w/w of $Al_2O_3$, 2-10% w/w of $TiO_2$, 9-20% w/w of $Fe_2O_3$ or FeO, and 3-10% w/w of CaO.

12. The method according to claim 10, wherein the regolith is sintered.

13. The method according to claim 10, wherein the regolith is melted.

14. The method according to claim 1, wherein the $TiO_2$ used in the shell portion is obtained by extracting from local soil.

15. The method according to claim 1, wherein the $TiO_2$ used in the shell portion is obtained by extracting from regolith.

16. The method according to claim 1, wherein the plurality of the interlockable building bricks are manufactured by a 3D Printer.

* * * * *